Jan. 15, 1963 W. M. BOOTH 3,073,519
MAGNETIC TICKET PUNCHING APPARATUS
Filed June 14, 1960 5 Sheets-Sheet 3

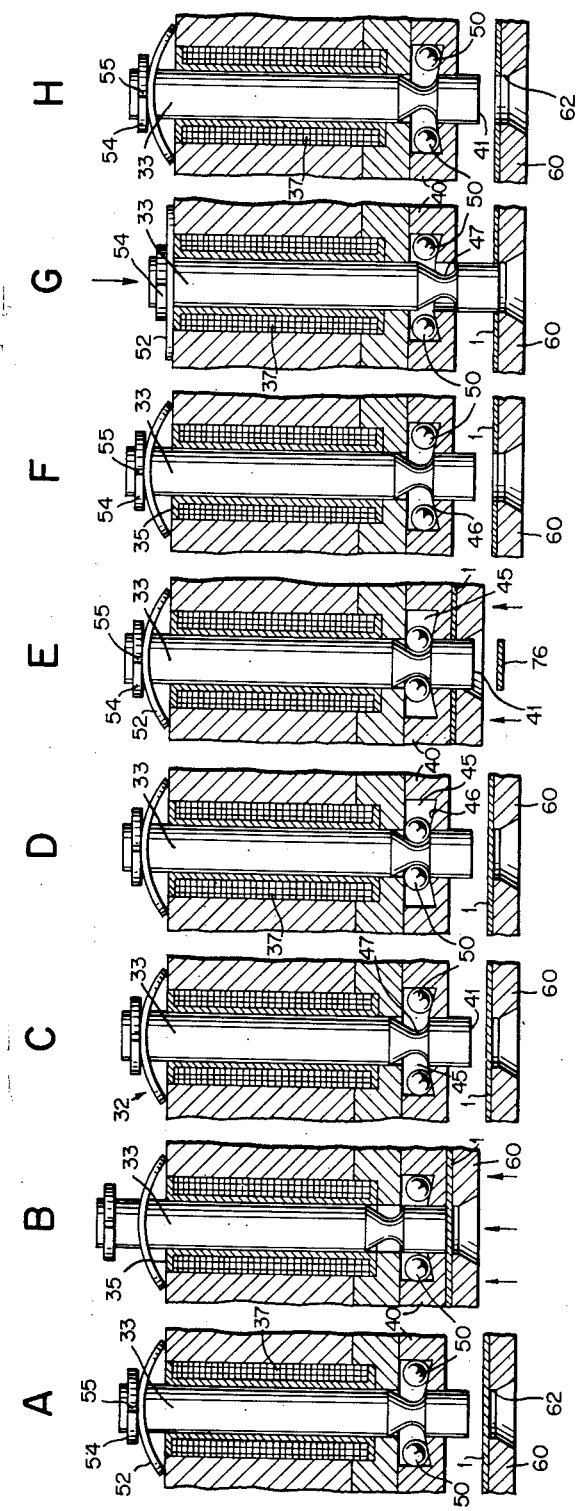

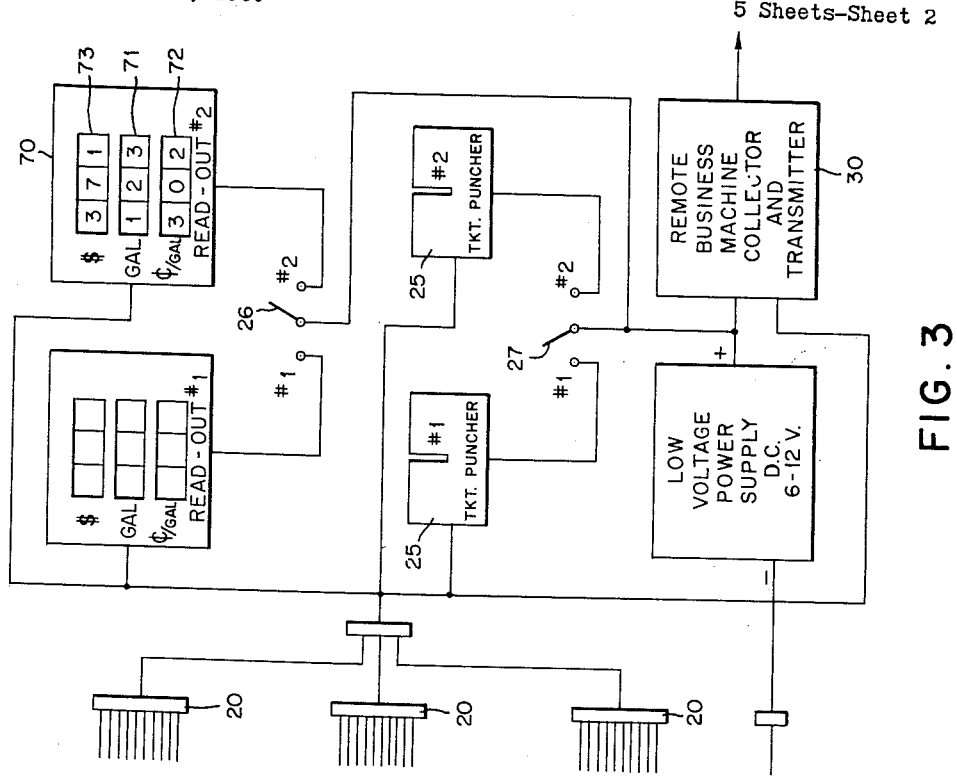
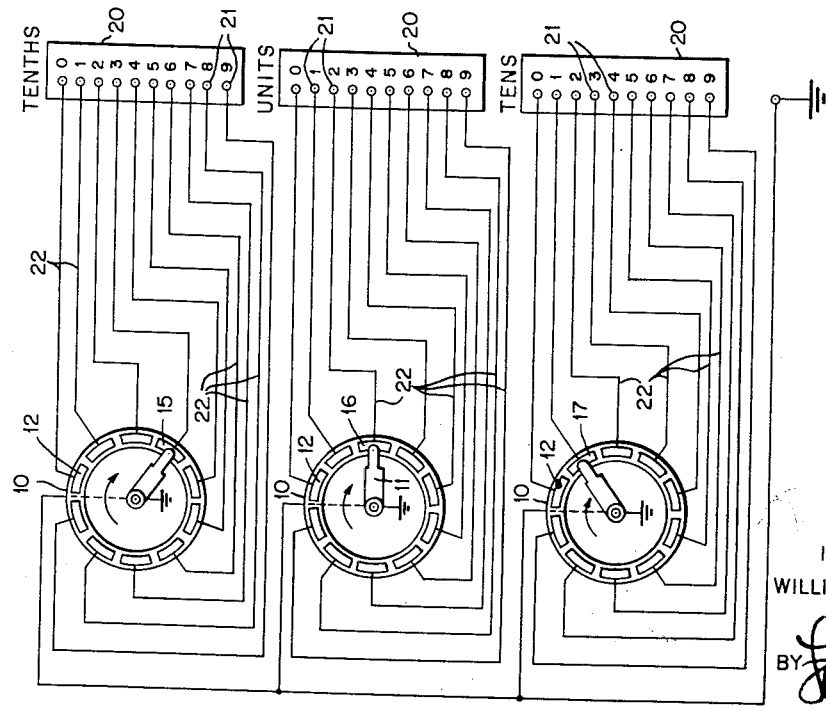

INVENTOR
WILLIAM M. BOOTH

ATTORNEY

Jan. 15, 1963 W. M. BOOTH 3,073,519
MAGNETIC TICKET PUNCHING APPARATUS
Filed June 14, 1960 5 Sheets-Sheet 4

INVENTOR
WILLIAM M. BOOTH
BY
ATTORNEY

Jan. 15, 1963

W. M. BOOTH 3,073,519

MAGNETIC TICKET PUNCHING APPARATUS

Filed June 14, 1960

INVENTOR
WILLIAM M. BOOTH

BY
ATTORNEY

United States Patent Office 3,073,519
Patented Jan. 15, 1963

3,073,519
MAGNETIC TICKET PUNCHING APPARATUS
William M. Booth, Grand Haven, Mich., assignor to John Wood Company, New York, N.Y., a corporation of Delaware
Filed June 14, 1960, Ser. No. 35,980
7 Claims. (Cl. 234—115)

My invention relates to magnetic ticket punching apparatus particularly adaptable for punching tabulating machine cards. My improved apparatus may be used in conjunction with various types of apparatus which include computing mechanism of the tens-transfer type. The apparatus is described herein, as a matter of convenience, when used in conjunction with gasoline dispensing pumps of the computing type which are well known and widely used in service stations throughout the United States and foreign countries.

A substantial percentage of the sales made of gasoline and other products at a service station are credit card charge sales to owners of automobiles who have been issued credit cards by the oil company whose products are sold at the service station which is identified with such oil company. The credit cards issued by most of the major oil companies have both the name of the person to whom the credit card was issued and his account number identification embossed on the credit card in machine readable characters.

After a sale of products by the service station, the credit card is placed in apparatus of a well known type and a multiple copy invoice is imprinted by use of the card. At present, the amount of the sale, number of gallons, etc. must be written in by the attendant at the service station, with one copy of the invoice given to the credit card purchaser for his records, another copy of the invoice retained by the service station owner or operator, and the other copies of the invoice are sent to the accounting department of the oil company whose products are being dispensed by the station.

Assuming that the credit card imprints the invoice with machine readable characters which may be scanned by well known types of scanning apparatus, such as "Scandex," the oil company is able to punch by machine a tabulating machine card with the account number of the person to whom the credit card has been issued. It then becomes necessary for the accounting department of the oil company to manually punch the tabulating machine card with the total amount of the sale, and other data, if desired. Usually, however, the accounting department of an oil company only manually punches the tabulating machine card to indicate the total amount of the sale. In monthly billings to the customer, a punched tabulating machine card is used as a bill and which will show only the total amount due for all purchases made by that credit card holder during a certain period. The oil company usually will include with such a punched tabulating machine card bill copies of the separate invoices which are only totaled on the bill.

Because of the millions of individual transactions by credit card holders which have to be handled by the accounting department, a time interval of two months or more between the time of sale and the billing to the customer is not unusual, which results in the oil companies having a very substantial amount of accounts outstanding which are not actually billed to the customer until some two or more months after the sale has been made.

With the use of my improved apparatus in conjunction with a gasoline dispensing pump of the commonly used computing type, a tabulating machine card, with the name and account number of the credit card purchaser imprinted thereon, may be punched with the amount of the sale, and, if desired, the amount of gasoline dispensed, etc. immediately after the sale has been made with the use of my apparatus at the pump, or in the service station building, or at a remote location, whichever may be desired.

One object of my invention is to provide tabulating machine card punching apparatus which, when used in conjunction with apparatus of the types which include computing mechanism of the tens-transfer type, will punch a tabulating machine card with the reading, or readings, of the number wheels of the tens-transfer mechanism.

Another object of my invention is to provide a tabulating machine card punching apparatus which will eliminate the need for costly mechanical, electrical, selsyn, or other directly attached means of connection between the computer unit and the tabulating machine card punching unit.

Another object of my invention is to provide a tabulating machine card unit which is readily and advantageously usable with remote read-out apparatus, pre-set delivery apparatus, tabulating machines, etc. and apparatus having other monitor functions.

Another object of my invention is to provide a ticket punching device which has a relatively low manufacturing cost; has no design limitations with respect to the distance or location of the device; and a device for which most of the parts thereof may be mass produced economically.

My invention may be more fully understood and further objects and advantages will become apparent when reference is made to the more detailed description of the invention with reference to the accompanying drawings wherein my invention is used, by way of example, with a gasoline dispensing pump of the computer type, and in which drawings:

FIG. 1 is a series of sectional views, on an enlarged scale, of one of the multiplicity of punching members of my improved apparatus showing the various positions of a punching member during the cyclic operation of my improved apparatus.

FIG. 2 is a schematic view of the circuit which feeds electrical signals to the tabulating machine card punching unit.

FIG. 3 is a schematic view showing the connection of the circuitry of FIG. 2 to the magnetic ticket punching device.

Gasoline pumps of the computing type are widely used and well known throughout the United States, and include a meter to which gasoline is delivered by pumping means from a source of supply, usually an underground tank. The meter includes a drive shaft which is operatively connected to the computing mechanism.

The gallon computing mechanism is of the well known tens-transfer type which includes wheels, or drums, with numbers on the periphery of the wheels from zero to nine. The computing mechanism includes a variator by which the number of gallons dispensed are computed to dollars and cents by another tens-transfer mechanism of the same type as the gallon register. The gallons tens-transfer customarily includes three wheels, or drums, with numbers from zero to nine on the periphery of each wheel. The gallon computing mechanism measures the gallons dispensed through a hose with a manually controlled nozzle valve at its distal end and will register 00.0 to 99.9 gallons. The dollar computing tens-transfer mechanism usually will indicate from $0.00 to $9.99, although four number wheels may be included to indicate from $00.00 to $99.99. The price per gallon indicator wheels, which are set automatically to conform to the setting of the variator, show from 00.0 cents to 99.9 cents per gallon. The fractions of a cent may appear as "1/10," etc.

Figure 8:
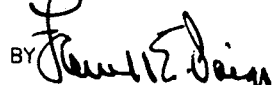
FIG. 8 is a plan view of a tabulating machine card of a type in common use.

Referring to said drawings; a tabulating machine card of the general type referred to herein is indicated by the reference mark 1 in FIG. 8. Merely as a matter of choice, the card has three headings "Price," "Gallons," "Sale $." If a circular punch be used, as shown for the tabulating machine card 1, the card includes under "Price" three columns of printed circles 2 numbered from zero to nine, for price per gallon ranging from 00.0 cents to 99.9 cents. The tabulating machine card 1 includes under "Gallons" three columns of printed circles 3 numbered from zero to nine for gallons of gasoline dispensed from 00.0 gallons to 99.9 gallons. The card 1 includes under the heading "Sales $" four columns of printed circles 5 numbered from zero to nine for the sale price per gallon from $00.00 to $99.99.

The left hand portion of the machine tabulating card 1, as shown in FIG. 8, is adapted to receive an imprint from the purchaser's credit card of the purchaser's name and the purchaser's account number with the oil company which issued the credit card. The tabulating machine card 1 customarily also includes the name or identification of the service station, and some indication of the oil company whose products are being sold at that station.

FIGS. 2 and 3 are schematic views of a circuit to transmit electrical signals to my improved magnetic ticket punching apparatus. As a matter of convenience, I have shown in FIG. 2 a circuit for the three tens-transfer wheels of the gallon register. The circuitry for the tens-transfer wheels of the dollar value computing mechanism is the same as for the gallon register.

A rotary switch stator plate 10 is rigidly positioned in close proximity to each of the rotatable three wheels (tenths, units, and tens) of the tens-transfer mechanism for gallons of gasoline dispensed, and which tens-transfer mechanism is of the old and well known type. A switch rotor 11, which is grounded, is rigidly connected to each of said three number wheels, each switch rotor 11 turning simultaneously with its number wheel. When the number "0" on any of the three wheels appears in the window opening of the dial plate for the computing unit of the gasoline pump, the rotor 11 would be in contact with the switch contact 12 of the rotor contact plate 10. As shown in FIG. 2, the roor 11 for the "tenths" of gallon number wheel is in contact with the switch member 15 when the numeral three appears in the window; the rotor 11 for the "units" number wheel is in contact with the switch member 16 when the numeral 2 appears in the window; and the rotor 11 for the "tens" number wheel is in contact with the switch member 17 when the numeral 1 appears in the window.

The identical rotary switch stator plates 10 may be fabricated conveniently from the well known printed electrical circuit stock, with the switch contacts, such as 12, 15, 16, 17, etc., not having been etched away. Each of the ten individual switch contacts on each stator plate 10 is connected separately to a terminal block 20, having a series of ten terminal connections 21, by suitable wiring 22.

I have shown in FIG. 3 a schematic drawing of the circuitry by which readings from two different computing gasoline pump units may be selectively transmitted not only to a magnetic ticket punching apparatus 25 by means of selector switches 26 and 27, but also to a remotely positioned business machine collector and transmitter 30.

In FIGS. 4, 5, 6, and 7 I have shown on an enlarged scale views of a single punch assembly 32 of my magnetically operated punching apparatus. In the complete punching apparatus assembly, a separate punch is provided for each of the one hundred circles shown on the tabulating machine card 1. In actual size, the punches are approximately 1/8" in diameter, as a matter of convenience, in order to be able to punch a standard size tabulating machine card.

Each punch assembly 32 includes a punch member 33 which is made of magnetizable steel, said punch member 33 being adapted to move up and down in a circular sleeve 35 which is surrounded by a coil 37.

All the punch assemblies 32 are mounted in a base 40 of non-magnetic material. The lower end 41 of each punch member 33 may be of curved configuration to more facilely perform its punching function on a tabulating machine card, such as indicated at 1. The base 40 is provided with annular recesses 45 surrounding each punch 33. The lower wall 46 of each recess 45 is inclined upwardly toward the annular groove portion 47 formed at the lower end of each punch member 33. The annular groove portions 47 are of a configuration at their lower most portion of which is substantially the same radius as the radius of the balls 50 made of magnetizable steel. The inner portion 51 of the upper wall is conical shaped to cause the balls 50 to more effectively lock the punch member 33. I find it convenient to provide each punch 33 with a convex spring, or spring washer, 52 which is conveniently retained at the upper end of the punch member 33 by means of a snap ring 54 which fits into a groove 55 formed at the upper part of each punch member 33. When the coil 37 surrounding a punch member 33 is energized, as hereinafter described, the punch member 33 becomes magnetized. I have found it desirable to use a D.C. current of a value of approximately 1½ volts for energizing the coil 37. With the punch member 33 being energized, the steel balls 50 are drawn from the position shown in full lines in FIG. 6 to the position shown in dotted lines in FIG. 6, with the balls 50 positioned in the piston member annular groove portion 47 which is of a radius substantially the same as the radius of the balls 50.

It is to be noted that the punch member 33 having more material below the horizontal center line of the coil 37, the punch member 33 will tend to raise, or center itself, in the flux pattern. Accordingly, the punch member 33 will be locked in its bore because of the overcenter position of the balls 50, as is best shown in dotted lines in FIG. 6. Such action by the balls 50 will take place as described, because of the lesser mass of the ball 50 in comparison with the greater mass of the punch member 33. Accordingly, the punch member 33 will be retained in the position shown in FIG. 6 for the purpose hereinafter described.

Figure 6:
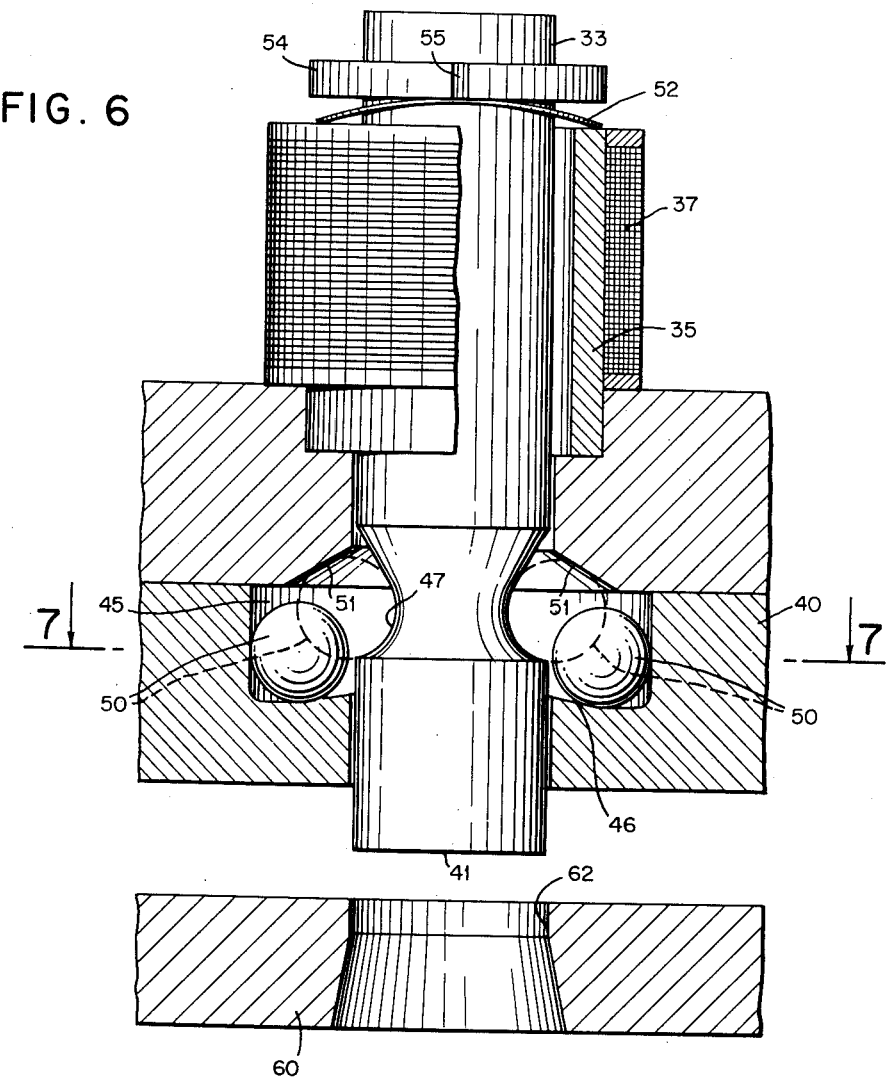
FIG. 6 is an enlarged scale sectional view, partly in elevation, showing one of the punching assemblies positioned with respect to a movable die, or platen member, support for a tabulating machine card to be punched.
Figure 7:
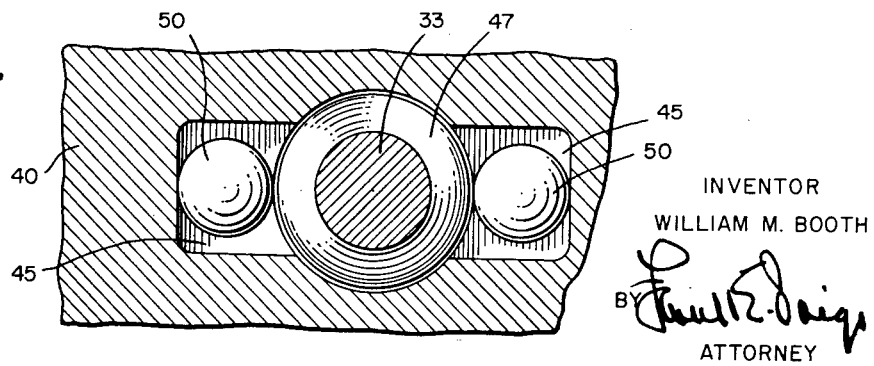
FIG. 7 is a fragmentary sectional view taken on the line 7—7— in FIG. 6.

A movable die, or platen, member 60 is positioned in spaced relation beneath the assembly unit of the multiplicity of punches 33, as indicated in FIGS. 6 and 1. The die member 60 is provided with a multiplicity of female die openings 62 which are coaxial with the punch member 33 positioned above.

Assume that a dispensation of gasoline has been made at a computing gasoline pump which embodies my invention, and that the switch 26, in FIG. 3, has been moved to close the circuit of the magnetic ticket punching apparatus of said pump, the dial face of which is shown schematically at 70 in FIG. 3, and that a tabulating machine card 1 has been positioned in suitable means on the movable die member 60.

As shown schematically in FIG. 3, the dial face 70 of the computing gasoline pump is provided with a window opening 71 for the three "gallons" wheels; a window opening 72 for the three "cents per gallon" wheels; and a window opening 73 for the wheels for the total cost of sale. In FIG. 3 the figures in window opening 71 show that 12.3 gallons of gasoline have been dispensed, at a price of 30.2 cents per gallon as shown in window opening 72; and at a sales cost of $3.71 as shown in window opening 73.

With the numeral 3 shown in the window opening 71 of the dial 70 for "tenths" of gallons; the rotor 11 will be in contact with the switch member 15 for the switch stator plate 10 of the "tenths" wheel, which will close the circuit and energize the coil 37 surrounding the punch member 33 for .3 gallon. With the numeral 2 shown in the window opening 71 for "units" of gallons, the rotor 11 will be in contact with the switch member 16 for the switch stator plate 10 of the "units" wheel, which will close the circuit and energize the coil 37 surrounding the punch member 33 for 2 "units" of gallons. With the numeral 1 shown in the window opening 71 for "tens" of gallons, the rotor 11 will be in contact with the switch member 17 for the switch stator plate 10 of the "tens" wheel which will close the circuit and energize the coil 37 surrounding the punch member 33 for 1 "tens" of gallons.

The posted price of 30.2 cents per gallon will appear automatically in the window opening 72 for the price per gallon when the variator of the computer unit is set to compute at 30.2 cents per gallon, in the manner well known in the art.

The sales cost of $3.71 shown in the window opening 73 of the dial 70 is punched in the tabulating machine card 1 in the same manner as described above in connection with the "gallons" tens-transfer unit. With the numeral 1 appearing in the window for the "cents" wheel, the rotor 11 of the "cents" wheel would be in contact with the proper switch contact of the switch stator plate for the "cents" wheel, and would close the circuit and energize the coil 37 surrounding a punch member 33 for 3 cents.

With the numeral 7 appearing in the window for the "tens" wheel, the rotor 11 of the "tens" wheel would be in contact with the proper switch contact of the switch stator plate for the "tens" wheel, and would close the circuit and energize the coil 37 surrounding a punch member 33 for 7 cents. With the numeral 3 appearing in the window for the "dollar" wheel, the rotor 11 of the "dollar" wheel would be in contact with the proper switch contact of the switch stator plate for the "dollar" wheel, and would close the circuit and energize the coil 37 surrounding a punch member 33 for $3.

FIG. 1 is a multiplicity of views, identified from A to H, inclusive, which show the positions of a single punch member during the various operations of my apparatus. Drawing A shows a single punch assembly 32 in which the coil 37 surrounding the punch member 33 has not been energized, and with a tabulating machine card 1 positioned on the movable die, or platen, member 60. The die member 60, with the tabulating machine card 1 thereon is moved upwardly to the position shown in B. As the coil 37 surrounding the punch member 33 has not been energized, the punch 33 is free to move upwardly in its sleeve member as the balls 50 would not be drawn into the recess 47 of the punch 33. Accordingly, the punch member is moved upwardly when the tabulating machine card comes into engaging contact with the lower end of the punch and the punch does not punch through the tabulating machine card 1. C shows the die member 60 moved downwardly with the card 1 remaining unpunched by that punch member 33.

D shows a punch member 33, of the punch assembly, which has been magnetized by the closing of the circuit to the coil 37 surrounding the punch member by reason of the fact that the rotor 11 is in engaging contact with a switch member of the switch stator plate 10. Such energization of the coil 37 causes the punch 33 to become magnetized and draw the balls 50 into the recess 47 formed at the lower end of the punch member 33, which will prevent the punch 33 from moving upwardly, and will cause the punch 33 to punch an opening in the card 1. E shows the die member 60 moved upwardly, which causes the rigidly held punch member 33 to punch an opening in the card 1, the punched out portion 76 shown below the axial opening formed in the die member 60.

I have found it desirable to clear all the punches of the punch assembly either after the completion of the punching of a card, or before a new card is punched. F, G, and H show a single punch member 33 as illustrative of the manner in which all the punch members in the punch assembly may be depressed by any convenient means from the position shown in F to the position shown in G so as to assure that all the balls 50 will be moved on out to the inclined plane 46 from whence they will roll to their initial position as shown in full lines in FIG. 6. Such a clearing action for all punches in the assembly is desirable in the event any dirt or foreign matter should inadvertently prevent the balls 50 from returning to their normal position so that the punch member 33 will be free to move upwardly in the event the coil surrounding the punch has not been energized in a subsequent use of the apparatus. Such clearing action also is desirable because it assures the customer of the proper functioning of the apparatus, and that the tabulating machine card will be punched only in accordance with the numeral indications appearing in the windows of the dial 70.

Figure 4:
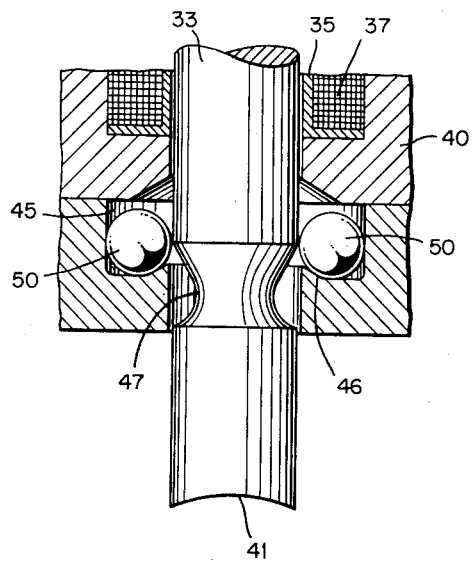
FIG. 4 is a fragmentary sectional view on an enlarged scale, of one of the punching assemblies when in non-operating position by reason of it not being energized.
Figure 5:
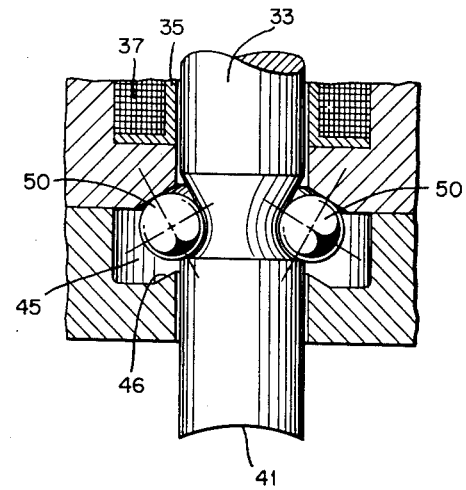
FIG. 5 is a sectional view, similar to FIG. 4, when in operating position by reason of being energized.

Although herein I have shown and described a light convex spring 52 retained by a snap ring 54 at the upper end of the punch member 33, it is to be noted that such a spring member is not essential to the proper functioning of my apparatus. With the annular recess 45 provided with an upwardly inclined lower wall 46 and with the inner portion 51 of the upper wall conical shaped, when the coil 37 is energized and the balls 50 drawn by magnetic forces to the position as shown in FIG. 5 and in dotted lines in FIG. 6, the balls 50 press against the conical portion 51 and lock the punch member 33 very securely against movement when any force is applied to the lower end 41 of the punch member 33. After the punching, or printing, operation has been completed and the coil 37 deenergized, the punch 33 returns by gravity to the position as shown in FIG. 4 and in full lines in FIG. 6. The tapered configuration of the punch 33 will effect a pushing movement outwardly of the balls 50, and cause them to move outwardly in the annular recess 45 to the position shown in FIG. 4 and in full lines in FIG. 6. In normal functioning of the apparatus, it has been found to be unnecessary to perform the punch clearing operation, as shown in F, G, and H of FIG. 1, and, accordingly, the spring member 52 is not required.

It is obvious that only ordinary mechanical skill would be required to incorporate with the movable die member 60, means to automatically open the circuit which energizes the coils 37 surrounding the punch members 33 when the die member 60 is returned to its initial position. It is also noted that the die member 60 may be moved manually or automatically by any of a number of old and well known means.

Figure 9:
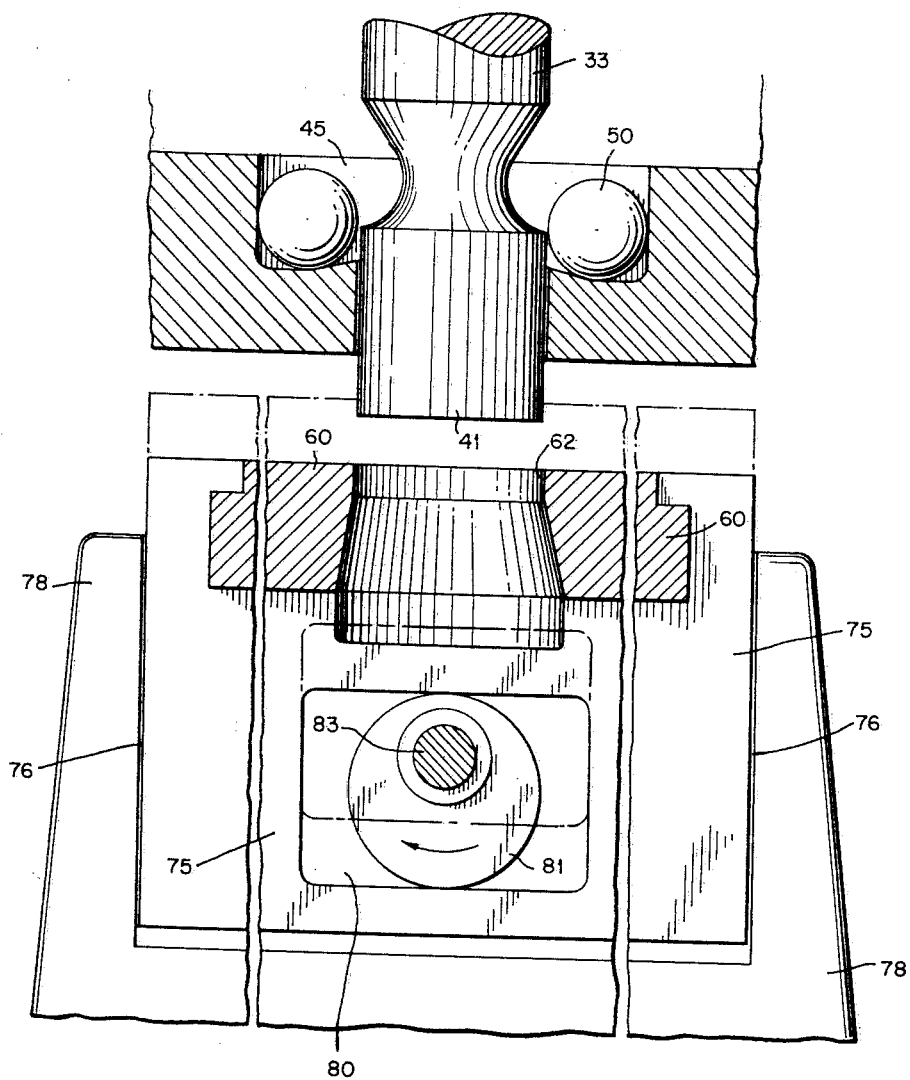
FIG. 9 is an enlarged scale fragmentary sectional view, partly in elevation and similar to FIG. 6, showing one form of well-known means for moving the die, or platen member, automatically toward and away from the punching assemblies.

I have shown in FIG. 9 one of the number of old and well-known means for moving the die member 60 automatically toward and away from the punching assemblies 32, said means includes the platen supporting member 75 in which the die member 60 is mounted at the upper part thereof. The platen supporting member 75 is slidably mounted in the opening 76 in the member 78 which has an elongated rectangular opening 80 at the lower part thereof. A circular eccentric cam member 81 is mounted in the opening 80 with the peripheral plane face of the cam 81 adapted to engage the upper and lower surfaces of the opening 80. The cam 81 is rigidly mounted on the shaft 83 which is adapted to be turned in the direction of the arrow on the cam 81, by any of the well-known convenient means. Rotation of the shaft 83 will effect movement of the supporting member 75 and the die member 60 rigidly mounted thereon toward and away from the punching assemblies 32, and from the position shown in full lines in FIG. 9 to the position shown in dotted lines, to effect punching of the card 1 by the punch members 33 which are in locked position in the manner heretofore described.

Although I have herein described my invention as a ticket punching apparatus, my invention also encompasses the use of such apparatus as a ticket printing apparatus. It is obvious that no more than ordinary mechanical skill would be required to provide the bottom faces of the punch member 33 with reverse numerals from "0" to "9," in lieu of a punching face, as described herein. Such reverse numerals could be of the machine readable character type. The printing faces could be inked by an inking roller, or an inking ribbon positioned over the multiple invoice tabulating machine card ticket 1, by any of the well known means which are old in the ticket printing field. Of course, in the use of my invention as a ticket printing apparatus, the movable platen member, similar to the movable die member 60, would have a solid face, and would be moved against the numeral faces only with the force necessary to imprint the ticket positioned on such member.

It is obvious that various modifications may be made in my apparatus as disclosed herein without departing from the essential features of my invention, and, therefore, I do not desire to limit myself to the precise details of construction and operation as herein described.

I claim:

1. A punching apparatus comprising a base member; a reciprocal magnetizable punching member slidably mounted in an opening in said base member; a coil surrounding said punching member to effect magnetization of said punching member, said coil adapted to be selectively energized by selective electrical circuit closing means; an annular groove in said punching member; an annular recess formed in said base member; and magnetizable rollable detent means in said annular recess formed in said base member; whereby, when said coil is energized and magnetizes said punching member, said rollable detent means are moved by magnetic forces into and held in said annular groove of punching member to maintain said punching member in operating position.

2. A punching apparatus comprising a base member; an opening in said base member; a magnetizable punching member slidably mounted in said opening in said base member; a coil surrounding said punching member to effect magnetization of said punching member, said coil adapted to be selectively energized by selective electrical circuit closing means; an annular groove in said punching member; an annular recess formed in said base member in alignment with said opening in said base member; and magnetizable ball detent means in said annular recess formed in said base member, said balls having a radius substantially equivalent to the radius of a portion of said annular groove of said punching member; whereby, when said coil is energized and magnetizes said punching member, said ball detent means are moved by magnetic forces into and held in said annular groove of said punching member to maintain said punching member in operating position.

3. A punching apparatus comprising a base member; an opening in said base member; a reciprocal magnetizable punching member slidably mounted in said opening in said base member; a coil surrounding said punching member to effect magnetization of said punching member, said coil adapted to be selectively energized by selective electrical circuit closing means; an axial sleeve in said coil in which said punching member is slidably mounted; an annular groove in said punching member; an annular recess formed in said base member, in alignment with said opening; magnetizable ball detent means in said annular recess formed in said base member, said balls having a radius substantially equivalent to the radius of a portion of said annular groove of said punching member; a movable female die member positioned in spaced relation beneath said punching member; an opening in said die member in alignment with and a configuration of said punching member and in which said punching member may be moved; and means to move said die member toward and away from punching member when said punching member is maintained in operating position; whereby, when said coil is energized and magnetizes said punching member, said ball detent means are moved by magnetic forces into and held in said annular groove of said punching member to maintain said punching member in operating position, and a punched opening may be formed in a work piece positioned on the top surface of said movable female die member.

4. A tabulating machine card magnetic punching apparatus comprising a base member; a multiplicity of openings in said base member; a separate reciprocal magnetizable punching member slidably mounted in each of said openings in said base member; a separate coil surrounding each of said punching members to effect magnetization of its punching member, said coils adapted to be separately selectively energized by selective electrical circuit closing mans; an axial sleeve in each of said coils in which its punching member is slidably mounted; an annular groove in each of said punching members; an annular recess formed in said base member for each of said punching members, each annular recess being in alignment with its opening in said base member; magnetizable ball detent means in each of said annular recesses formed in said base member, said balls having a radius substantially equivalent to the radius of a portion of said annular grooves of said punching members; whereby, when a said coil is energized and magnetizes its punching member, said ball detent means are moved by magnetic forces into and held in said annular groove of its punching member to maintain that punching member in operating position.

5. A tabulating machine card magnetic punching apparatus comprising a base member; a multiplicity of openings in said base member; a separate reciprocal magnetizable punching member slidably mounted in each of said openings in said base member; a separate coil surrounding each of said punching members to effect magnetization of its punching member, said coils adapted to be separately selectively energized by selective electrical circuit closing mans; an axial sleeve in each of said coils in which its punching member is slidably mounted; an annular groove in each of said punching members; an annular recess formed in said base member for each of said punching members, each annular recess being in alignment with its openings in said base member; magnetizable ball detent means in each of said annular recesses formed in said base member, said balls having a radius substantially equivalent to the radius of a portion of said annular grooves of said punching members; a movable female die member positioned in spaced relation beneath said multiplicity of punching members; an opening in said die member in alignment with and a configuration of each of said punching members and in which said punching members may be moved; and means to move said die member toward and away from said punching members when said punching members are maintained in operating position; whereby, when said coil is energized and magnetizes said punching member, said ball detent means are moved by magnetic forces into and held in said annular groove of said punching member to maintain said punching member in operating position, and punched openings may be formed in a tabulating machine card positioned on the top surface of said movable female die member.

6. Apparatus comprising a service station gasoline dispensing pump of the computer type which includes a tens-transfer computing mechanism which has a series of wheels with number indicia around the peripheral flange of each of said number wheels; a switch stator plate rigidly positioned in close proximity to each of said number wheels, each stator plate having on its face a separate switch contact for each number on said number wheel; a switch rotor rigidly connected axially to each of said number wheels, said switch rotor turning simultaneously with its number wheel and adapted to engagingly contact said switch contacts on said stator plate; a tabulating machine card punching apparatus comprising a base member; a multiplicity of openings in said base member; a separate reciprocal magnetizable punching member slidably mounted in each of said openings in said base member; a separate coil surrounding each of said punching members to effect magnetization of its punching member, said coils adapted to be separately selectively energized by selective electrical circuit closing means; an axial sleeve in each of said coils in which its punching member is slidably mounted; an annular groove in each of said punching members; an annular recess formed in said base member for each of said punching members, each annular recess being in alignment with its opening in said base member; magnetizable ball detent means in each of said annular recesses formed in said base member, said balls having a radius substantially equivalent to the radius of a portion of said annular grooves of said punching members; whereby, when a said coil is energized and magnetizes its punching member, said ball detent means are moved by magnetic forces into and held in said annular groove of its punching member to maintain that punching member in operating position.

7. Apparatus comprising a service station gasoline dispensing pump of the computer type which includes a tens-transfer computing mechanism which has a series of wheels with number indicia around the peripheral flange of each of said number wheels; a switch stator plate rigidly positioned in close proximity to each of said number wheels, each stator plate having on its face a separate switch contact for each number on said number wheel; a switch rotor rigidly connected axially to each of said number wheels, said switch rotor turning simultaneously with its number wheel and adapted to engagingly contact said switch contacts on said stator plate; a tabulating machine card punching apparatus comprising a base member; a multiplicity of openings in said base member; a separate reciprocal magnetizable punching member slidably mounted in each of said openings in said base member; a separate coil surrounding each of said punching members to effect magnetization of its punching member, said coils adapted to be separately selectively energized by selective electrical circuit closing means; an axial sleeve in each of said coils in which its punching member is slidably mounted; an annular groove in each of said punching members; an annular recess formed in said base member for each of said punching members, each annular recess being in alignment with its opening in said base member; magnetizable ball detent means in each of said annular recesses formed in said base member, said balls having a radius substantially equivalent to the radius of a portion of said annular grooves of said punching members; a movable female die member positioned in spaced relation beneath said multiplicity of punching members; an opening in said die member in alignment with and a configuration of each of said punching members and in which said punching members may be moved; and means to move said die member toward and away from said punching members when said punching members are maintained in operating position; whereby, when said coil is energized and magnetizes said punching member, said ball detent means are moved by magnetic forces into and held in said annular groove of said punching member to maintain said punching member in operating position, and punched openings may be formed in a tabulating machine card positioned on the top surface of said movable female die member.

References Cited in the file of this patent
UNITED STATES PATENTS

| | | |
|---|---|---|
| 1,500,086 | Liebender | July 1, 1924 |
| 2,377,791 | Lake | June 5, 1945 |
| 2,857,969 | Johnston | Oct. 28, 1958 |